United States Patent [19]

Tadros et al.

[11] Patent Number: 4,980,061
[45] Date of Patent: Dec. 25, 1990

[54] COATING PROCESS FOR COMPOSITE REVERSE OSMOSIS MEMBRANES

[75] Inventors: Safwat E. Tadros, Claymont; Yves M. Trehu, Wilmington, both of Del.

[73] Assignee: E. I. du Pont de Nemours and Company, Wilmington, Del.

[21] Appl. No.: 401,474

[22] Filed: Aug. 29, 1989

Related U.S. Application Data

[63] Continuation of Ser. No. 198,647, May 27, 1988, abandoned, which is a continuation of Ser. No. 788,137, Oct. 16, 1985, abandoned.

[51] Int. Cl.$^5$ .............................................. B01D 63/02
[52] U.S. Cl. ......................... 210/490; 210/500.23; 210/500.38; 210/500.41; 427/245
[58] Field of Search ............................ 264/181, 182; 210/500.23, 490, 500.38, 500.41, 654; 427/245, 246

[56] References Cited

U.S. PATENT DOCUMENTS

| | | | |
|---|---|---|---|
| 3,071,806 | 1/1963 | Rosenthal | 264/181 |
| 3,121,764 | 2/1964 | Macura | 264/181 |
| 3,228,877 | 1/1966 | Mahon | 210/500.23 X |
| 4,141,942 | 2/1979 | Maehara | 264/182 X |
| 4,230,463 | 10/1980 | Henis et al. | 55/73 X |

FOREIGN PATENT DOCUMENTS 0072002 2/1983 European Pat. Off. .
58-196633 5/1985 Japan .

*Primary Examiner*—Frank Spear

[57] ABSTRACT

A process for preparing reverse osmosis membranes is disclosed. A microporous hollow support fiber is passed through a solution of a monomer capable of undergoing condensation polymerization and such as m-phenylene diamine up through a capillary into a sedond less dense solution of a second monomer capable of undergoing condensation with said first monomer, such as trimesoyl chloride or cyclohexane-1,3,5-tricarbonyl chloride. The resulting fiber has a polymeric film deposited thereon which is effective as a reverse osmosis membrane.

13 Claims, 3 Drawing Sheets

COATING PROCESS FOR COMPOSITE REVERSE OSMOSIS MEMBRANES

This application is a continuation of U.S. Ser. No. 198,647 filed May 27, 1988 which is a continuation of U.S. Ser. No. 788,137 filed Oct. 16, 1989, both now abandoned.

BACKGROUND

1. Field of the Invention

The present invention relates to a two step process for forming a polymeric coating on a porous substrate. In the present invention the porous substrate moves from a first bath which applies a first monomer to the porous substrate to a second bath which has a common interphase with the first bath. A second monomer is applied to the substrate in the second bath and the two monomers condensed to form a polymer layer which is effective as a reverse osmosis membrane.

2. Prior Art

U.S. Pat. No. 4,277,344 discloses interfacially synthesized reverse osmosis membranes wherein an aromatic polyamide is derived from a monomeric aromatic polyacylhalide which is three fold or higher in acyl functionality and a monomeric arylene polyamine.

SUMMARY OF THE INVENTION

The present invention relates to a process for preparing composite hollow fine fiber reverse osmosis membranes by interfacial polymerization. A porous hollow fiber is passed through a dense solution of one monomer, and without going through a gas phase, through a second less dense solution of another monomer capable of rapid condensation polymerization with the first monomer in the second bath to form a condensation polymer layer on the porous hollow fiber which is effective as a reverse osmosis membrane.

DETAILED DESCRIPTION OF THE DRAWINGS

Figure 1:
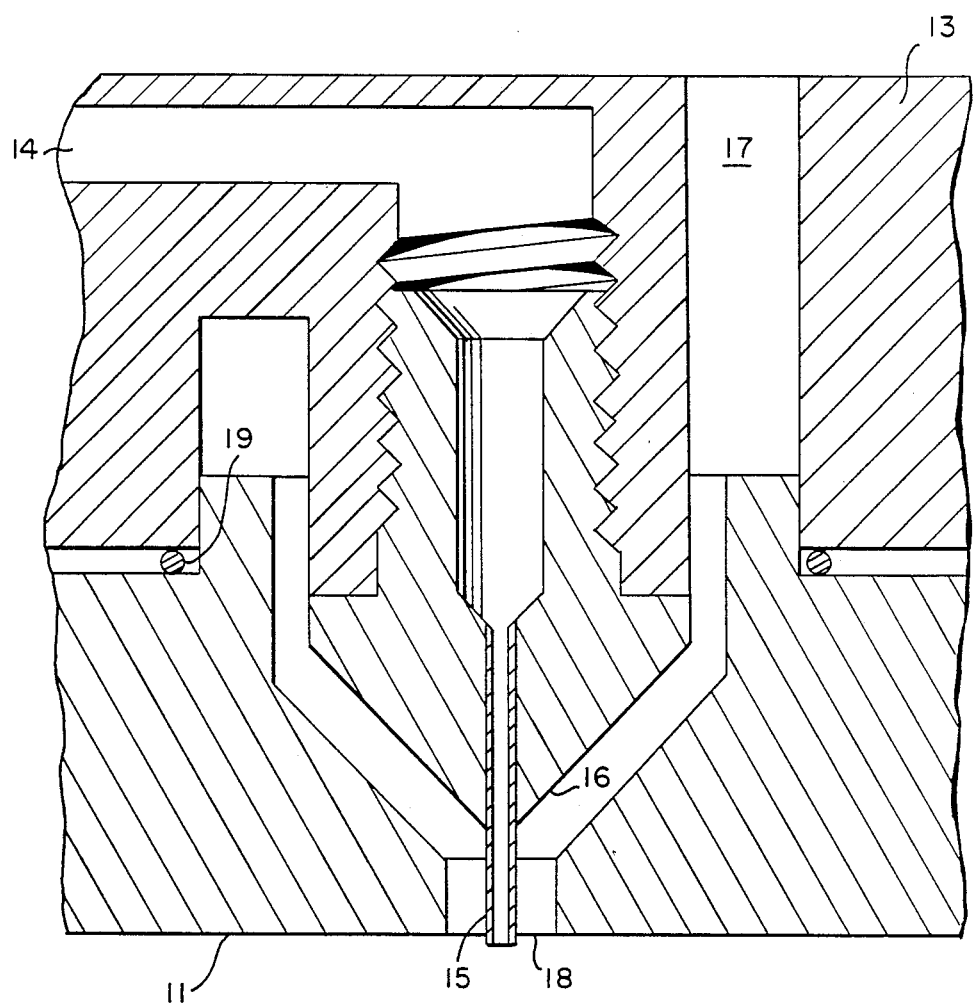
FIG. 1 is a partial cross-section of a spinnerette used to form hollow fibers.

Referring now to FIG. 1, a spinnerette for spinning hollow fibers is indicated generally as 11 spinnerette consists of die 12, and block 13 which are held together by bolts, not shown. The fluid which is to be fed to the center of the hollow fiber is fed through passage 14 in block 13 to hollow tip 15. Hollow tip 15 is held in block 13 by retainer 16. Fluid which is to form the hollow fiber is fed through passage 17 in block 13 and out die opening 18. Hollow tip 18 is adjusted within die opening by differential tightening of the bolts holding die 12 to block 13 with the flexibility for so doing being provided by metal ring 19.

Figure 2:
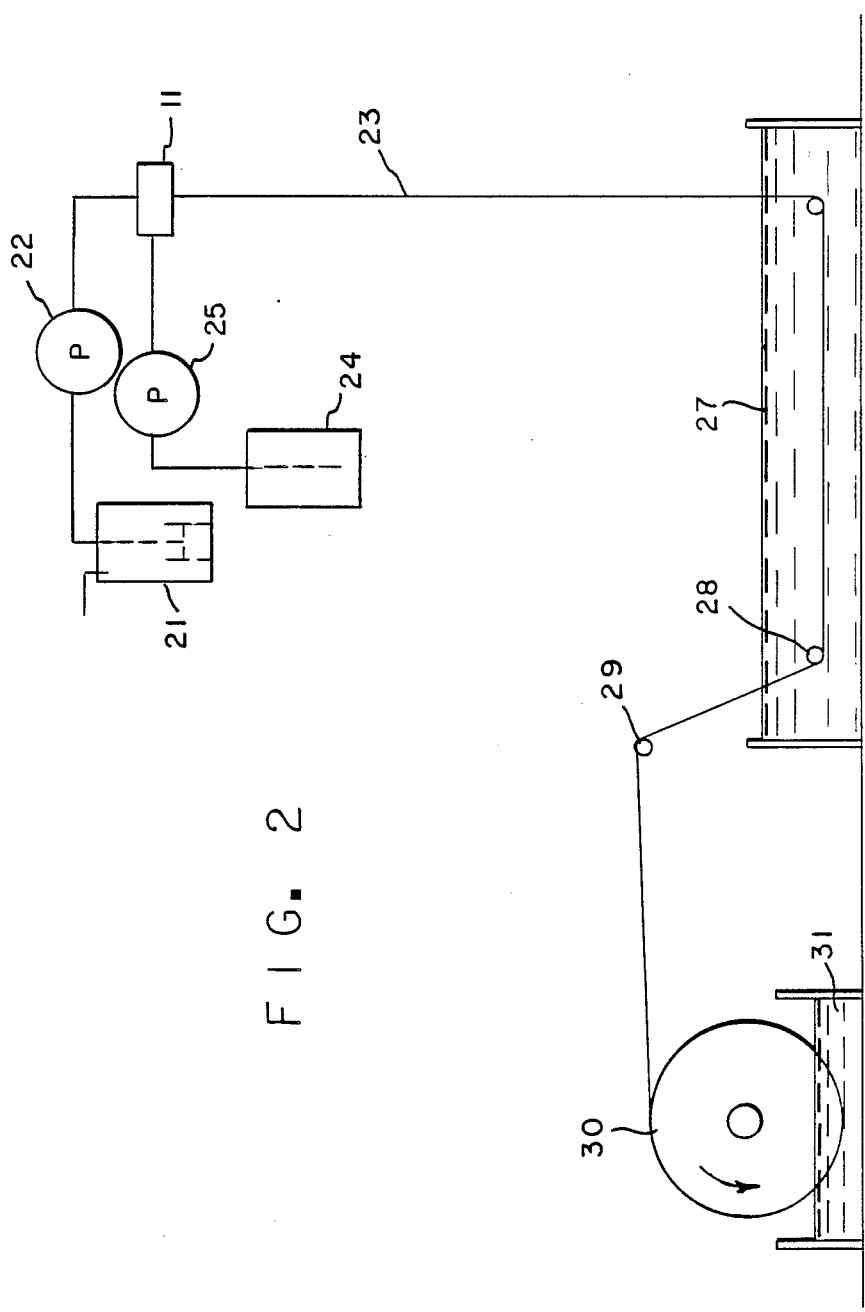
FIG. 2. is an overall schematic of the system used to make hollow fibers.

Referring now to FIG. 2, a solution of the polymer which is to form the hollow fiber is pumped from reservoir 21 by means of gear pump 22 to die 11. The fluid which forms the center of the hollow fiber 23 is pumped from reservoir 24 by means of gear pump 25 to die 11. Hollow fiber 23 is removed from die 11 and drawn over pin 26 in quench bath 27. Hollow fiber is drawn over pin 28, removed from quench bath 27, drawn over pin 29 and taken up on take-up reel 30 rotating partially in bath 31.

Figure 3:
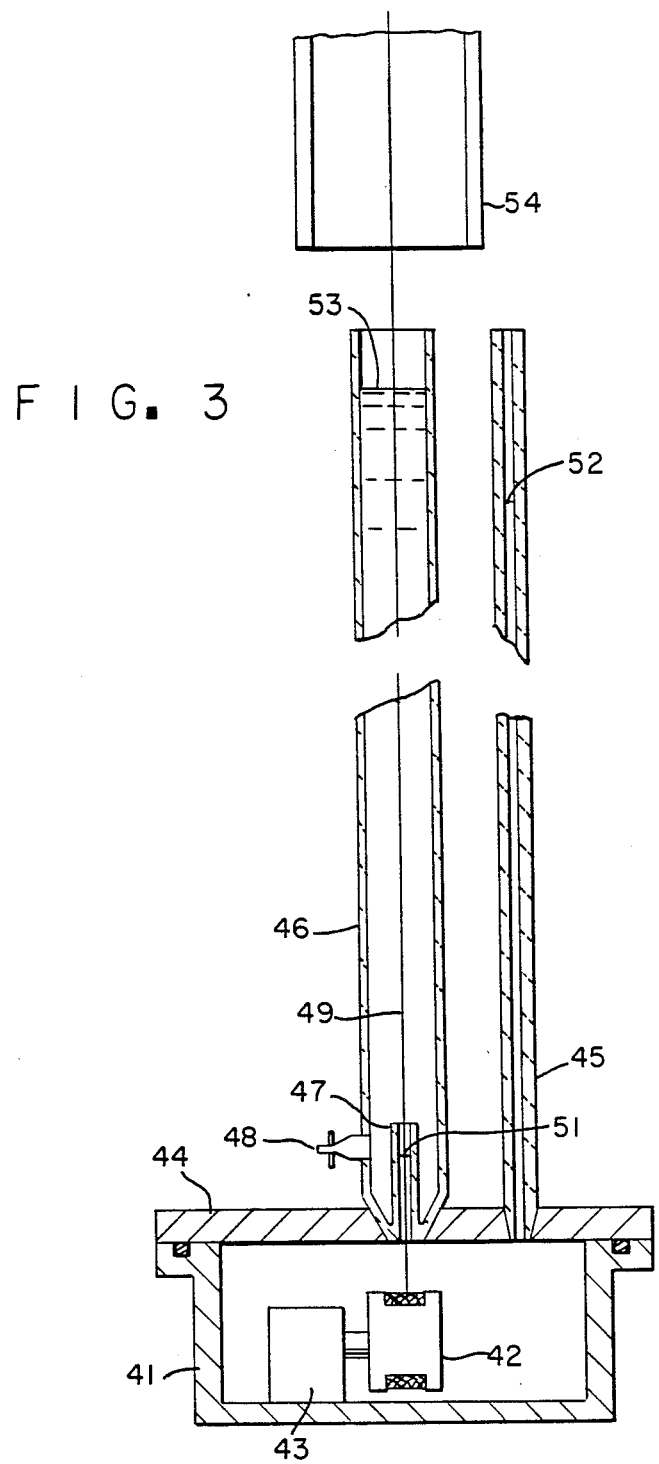
FIG. 3. is a cross-section of the apparatus used to form the polymer coating on the hollow fibers.

Referring now to FIG. 3, container 41 is fitted with bobbin 42 mounted in bearing and support 43. Container 41 is completely filled with a first solution of monomer. Lid 44 is mounted on container 41, and receives capillary 45 and tube 46. Tube 46 is fitted with capillary 47 and drain 48. Hollow fiber 49 is removed from bobbin 42 through a solution of m-phenylenediamine in water in container 41 and through a solution of trimesoyl chloride or cyclohexane-1,3,5,-tricarbonyl chloride in an organic solvent in tube 46. The interface 51 between the two solutions is maintained in capillary 47 by maintaining levels 52 and 53 of the solutions at the proper height in capillary 45 and tube 46. After leaving tube 46 hollow fiber 49 is passed through drier 54.

DETAILED DESCRIPTION

Composite reverse osmosis membranes have potentially higher fluxes and better mechanical properties than homogeneous asymmetric membranes. A practical technology already developed uses interfacial polymerization wherein a porous substrate moves from a first bath through a gas phase (air) into a second bath where the interfacial polymerization takes place. When this technology is applied to a porous hollow fine fiber substrate, one finds that for practical fiber dimensions with an outside diameter of less than 300 $\mu m$ no salt rejecting layer of polymer can be obtained because of the difficulty of keeping the substrate sufficiently wet between the two baths. It has now been found that this problem can be solved, and a fiber useful in reverse osmosis be prepared by providing a common liquid-liquid interface between the two baths and moving the fiber directly from the first bath into the second bath without passage through a gas phase. The interface preferably is maintained in a vertically disposed zone of reduced size such as a capillary of 1 to 100 mm inside diameter and preferably 3-8 mm inside diameter.

The support hollow fiber or support film may be drawn substantially vertically either up or down through a first bath containing one of the condensation monomers into a second bath containing the complimentary monomer. The solvents used in the two baths should be immiscible with each other. The solvent in the lower bath is denser than the solvent in the upper bath. Normally the polyfunctional amine is applied first for which the preferred solvent is water. The preferred polyfunctional amine for use herein is m-phenylenediamine which generally is present in an amount of from 0.5 to 10 wt % of the solvent.

Upon exiting the microporous substrate passes through a liquid-liquid interface into a bath containing the complimentary condensation polymerization monomer. If the microporous substrate is traveling upwardly the solvent in the second bath is preferably less dense than the solvent in the first bath. If the microporous substrate is traveling downwardly the solvent in the second bath preferably is denser than the solvent in the first bath. For upward travel of the microporous substrate the preferred solvents are the hydrocarbons. Preferred hydrocarbon solvents are those having the formula $C_nH_{2n+2}$ where n is 4 to 8. Hexane is an especially preferred solvent. For downward travel of the microporous substrate the preferred solvents are the chlorofluorocarbons such as 1,1,2-trichloro-1,2,2-trifluoroethane. Using a small capillary and balancing pressure heads, it is possible to travel upwardly in this case also. Generally the monomer in the second bath will be present in an amount of from 0.01 to 2 wt % of the solvent, with from 0.1 to 0.5 wt % based on solvent being the preferred range. The preferred monomers are trimesoyl chloride and cyclohexane-1,3,5-tricarbonyl chloride. With the preferred monomers the reaction can be carried out at room temperature, although temperatures of from 5° to 80° C. can readily be used.

The permselective hollow fibers of the present invention comprise a polymeric microporous support such as a polysulfone or polyvinyl chloride and in intimate occluding contact with said support a permselective polyaramide. Generally the permselective polyaramide will be from 50 to 2500 Å m in thickness.

The hollow fiber generally will have an outside diameter of from 75 to 600 μm and an inside diameter of from 25 to 300 μm with a wall thickness of from 25 to 300 μm. The preferred hollow fibers have an outside diameter of from 150 to 250 μm, an inside diameter of from 50 to 150 μm and a wall thickness of from 25 to 100 μm.

EXAMPLES

EXAMPLE 1

A polysulfone hollow fine fiber is prepared by spinning from a die such as shown in FIG. 1, and the spinning set up shown in FIG. 2. A solution of a polysulfone derived from bisphenol A and p,p'-dichlorodiphenyl sulfone having a molecular weight of about 35,000 is used as the spinning solution. In Example 1 the spinning solution contained 27% polysulfone, 20% polyvinylpyrrolidone and the remainder a 3/1 mixture of dimethyl formamide and tetrahydrofuran. In Examples 2-5 the spinning solution contained 27% polysulfone, 10% polyvinylpyrrolidone and the remainder a 3/1 mixture of dimethyl formamide and tetrahydrofuran. The die had an outside diameter of 0.008 inch ($2 \times 10^{-5}$ M) A mixture of 60% dimethyl formamide and 40% water is fed into the bore of the fiber. The quench tank contains water at room temperature. The speed with which the hollow fiber is moved is varied to provide fibers of the diameter reported in the Table.

The fibers are then coated using the apparatus shown in FIG. 3. The lower chamber has the substrate fiber on a bobbin immersed in 2 wt % aqueous solution of m-phenylenediamine. Tube 46 contains a 0.25 wt. % solution of trimesoyl chloride in cyclohexane. Capillary tube 47 has an inside diameter of 5 mm. The interface is maintained at a constant level within capillary tube 47. The fiber is drawn up through the interface where an aromatic polyamide film s formed; the fiber is then drawn through drier 54 maintained at 60° to 70° C. depending on the solvent used in 46 and finally collected on a take-off drum. The interface between the two solutions is maintained in capillary tube 47 by adding m-phenylene diamine solution to the apparatus.

TABLE

| Ex No. | OD μm | ID μm | Reaction Time sec | Kw Uncoated m/sec•TPa | Kw Coated m/sec•TPA | Salt Rejection % |
|---|---|---|---|---|---|---|
| 1 | 210 | 100 | 15 | 5 | 0.06 | 90 |
| 2 | 190 | 110 | 12 | 0.6 | 0.09 | 89 |
| 3 | 190 | 110 | 8 | 0.6 | 0.36 | 96 |
| 4 | 205 | 105 | 12 | 0.4 | 0.08 | 87 |
| 5 | 205 | 105 | 8 | 0.4 | 0.2 | 91 |

We claim:

1. A process for preparing a permselective membrane comprising feeding a microporous hollow first support membrane having an outside diameter of from 150 to 250 μm through a first solution containing from 0.5 to 10 weight percent of a condensation monomer, feeding said microporous hollow support membrane generally vertically through a horizontally disposed liquid-liquid interface and into a second solution which is immiscible with said first solution and which contains from 0.01 to 2 weight percent of a monomer capable of rapidly polymerizing with said first monomer at the operating temperature while in said second solution, one of said monomers being an aromatic diamine and the other of said monomers being at least one polyfunctional, acid chloride comprising trimesoyl chloride or cyclohexane-1,3,5-tricarbonyl chloride.

2. The process of claim 1 wherein the microporous support is in the form of a hollow fiber.

3. The process of claim 2 wherein the liquid-liquid interface is in a capillary.

4. The process of claim 1 wherein the first monomer is a diamine.

5. The process of claim 4 wherein the second monomer is a polyfunctional acid chloride.

6. The process of claim 5 wherein the diamine comprises m-phenylene diamine.

7. The process of claim 6 wherein the polyfunctional acid chloride comprises trimesoyl chloride or cyclohexane-1,3,5-tricarbonyl chloride.

8. The process of claim 7 wherein the solvent in the first bath is water.

9. The process of claim 8 wherein the solvent in the second bath is hydrocarbon in nature.

10. A hollow fiber reverse osmosis membrane comprising a polymeric microporous support membrane and in occluded contact therewith a permselective interfacially polymerized aromatic polyamide derived from an aromatic diamine and a polyfunctional acid chloride comprising trimesoyl chloride or cyclohexane-1,3,5-tricarbonyl chloride, which hollow fiber has an outside diameter of from 75 to 300 μm.

11. The hollow fiber of claim 10 wherein the outside diameter of the fiber is from 150 to 250 μm.

12. The hollow fiber of claim 1 wherein the permselective polyamide consists essentially of repeating units derived from m-phenylenediamine and either trimesoyl chloride or cyclohexane-1,3,5-tricarbonyl chloride.

13. The hollow fiber of claim 12 wherein the microporous support is a polysulfone.

* * * * *

UNITED STATES PATENT AND TRADEMARK OFFICE
CERTIFICATE OF CORRECTION

PATENT NO. : 4,980,061
DATED : December 25, 1990
INVENTOR(S) : Tadros et al

It is certified that error appears in the above—identified patent and that said Letters Patent is hereby corrected as shown below:

In the claims, column 4,

Lines 28 and 29, delete claim 2 in its entirety.

Line 30, delete "3" and substitute therefor --2--; also
        delete "2" and substitute therefor --1--.

Line 32, delete "4" and substitute therefor --3--; also
        delete "1" and substitute therefor --2--.

Line 34, delete "5" and substitute therefor --4--; also
        delete "4" and substitute therefor --3--.

Line 36, delete "6" and substitute therefor --5--; also
        delete "5" and substitute therefor --4--.

Line 38, delete "7" and substitute therefor --6--; also
        delete "6" and substitute therefor --5--.

Line 41, delete "8" and substitute therefor --7--; also
        delete "7" and substitute therefor --6--.

UNITED STATES PATENT AND TRADEMARK OFFICE
CERTIFICATE OF CORRECTION

PATENT NO. : 4,980,061
DATED : December 25, 1990
INVENTOR(S) : Tadros et al

It is certified that error appears in the above—identified patent and that said Letters Patent is hereby corrected as shown below:

In the claims, column 4,

Line 43, delete "9" and substitute therefor --8--; also
delete "8" and substitute therefor --7--.

After Claim 8 (as amended above), insert new claim 9 as follows:
-- The process of claim 8 wherein the solvent in the second bath has the formula $C_nH_{2n+2}$ where n is 4 to 8.--

Line 55, delete "1" and substitute therefor --11--.

Signed and Sealed this

Twenty-second Day of December, 1992

Attest:

DOUGLAS B. COMER

*Attesting Officer*  *Acting Commissioner of Patents and Trademarks*